Feb. 17, 1925.

J. H. KINTZELE 1,526,345

WASHER PLACING MACHINE FOR RUBBER HEEL MOLDS

Filed Nov. 28, 1923    12 Sheets-Sheet 4

Inventor:
Julius H. Kintzele,
by Rippey Kingsland.
His Attorneys.

Feb. 17, 1925.
J. H. KINTZELE
WASHER PLACING MACHINE FOR RUBBER HEEL MOLDS
Filed Nov. 28, 1923
1,526,345
12 Sheets-Sheet 5

Inventor:
Julius H. Kintzele,
His Attorneys.

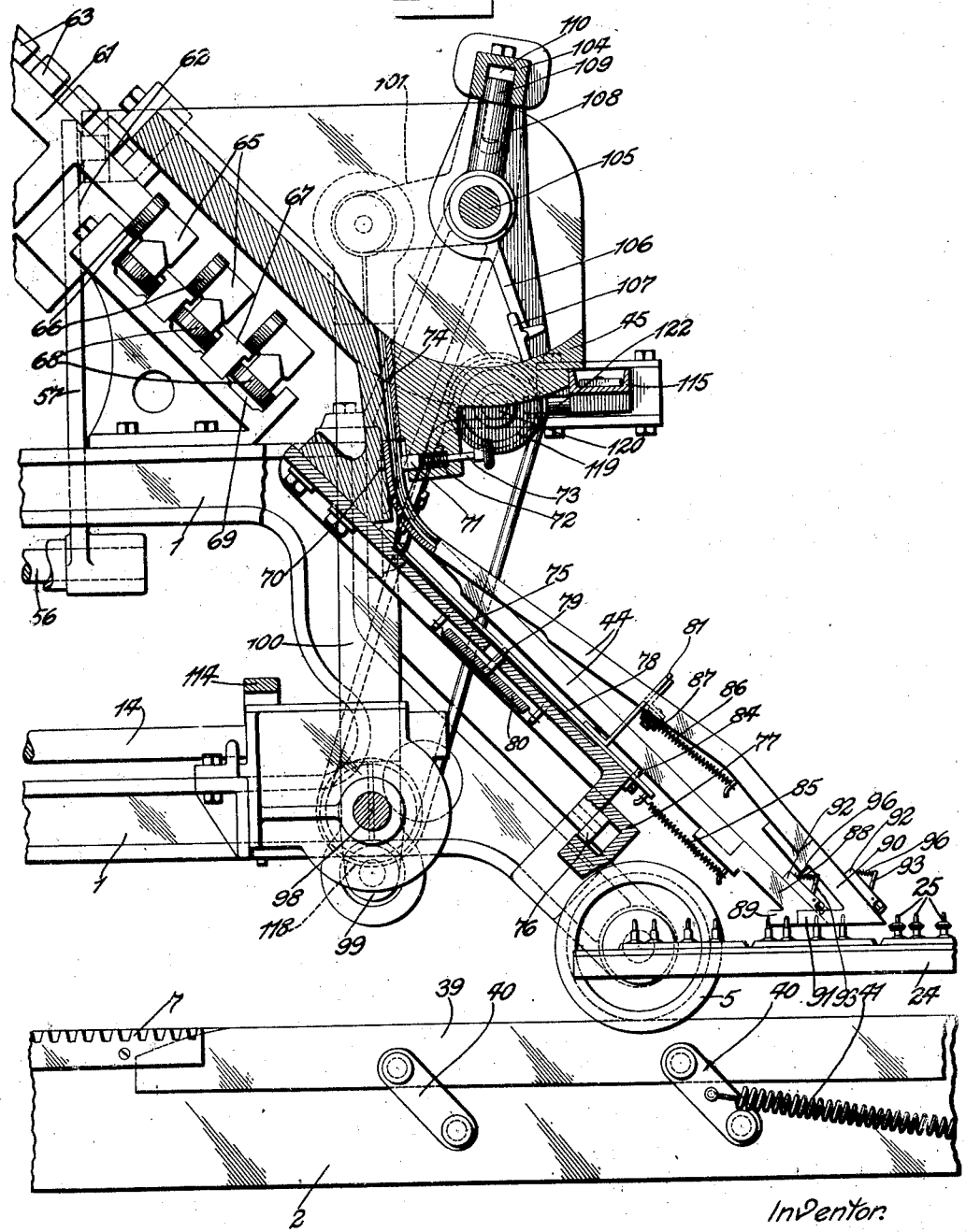

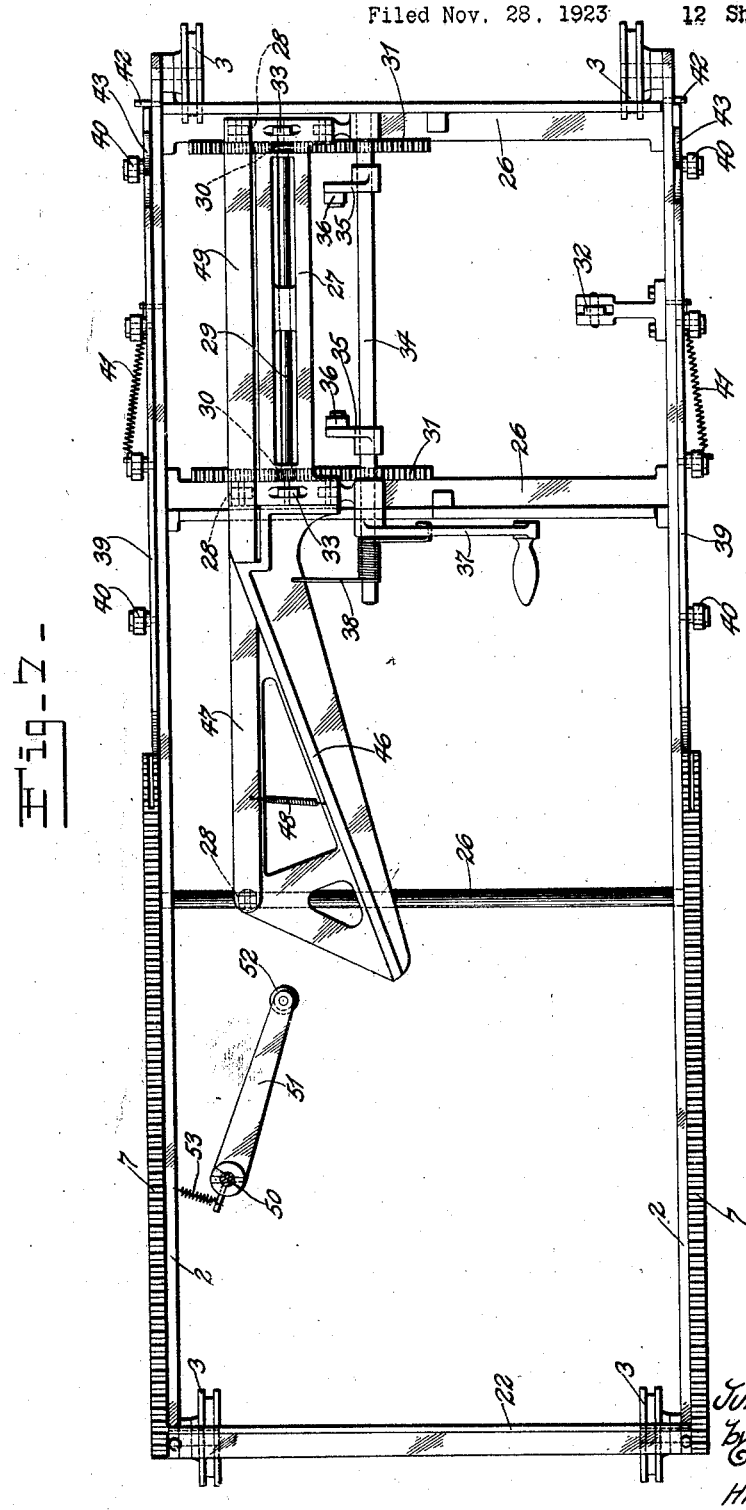

Feb. 17, 1925.
J. H. KINTZELE
1,526,345
WASHER PLACING MACHINE FOR RUBBER HEEL MOLDS
Filed Nov. 28, 1923
12 Sheets-Sheet 8
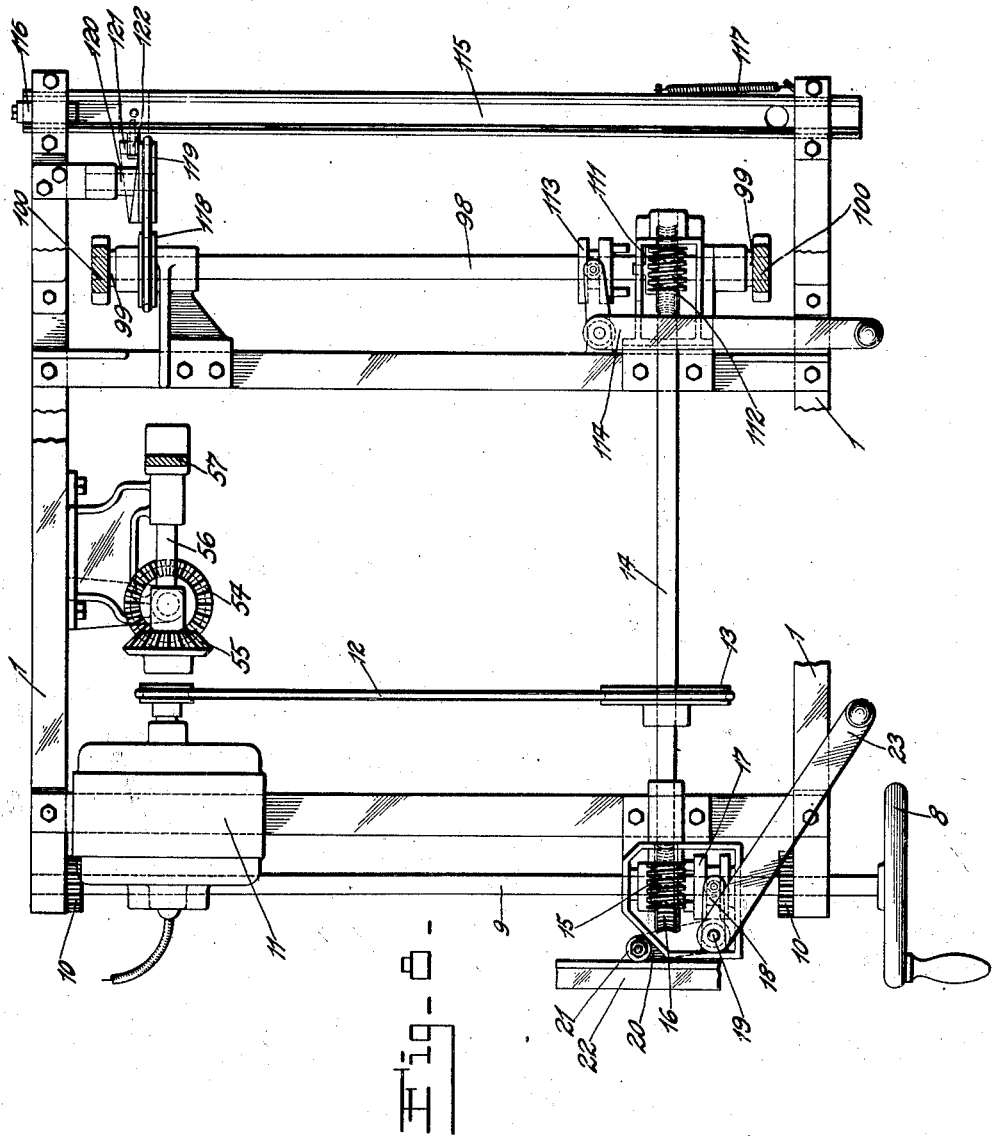
Inventor:
Julius H. Kintzele,
His Attorneys.

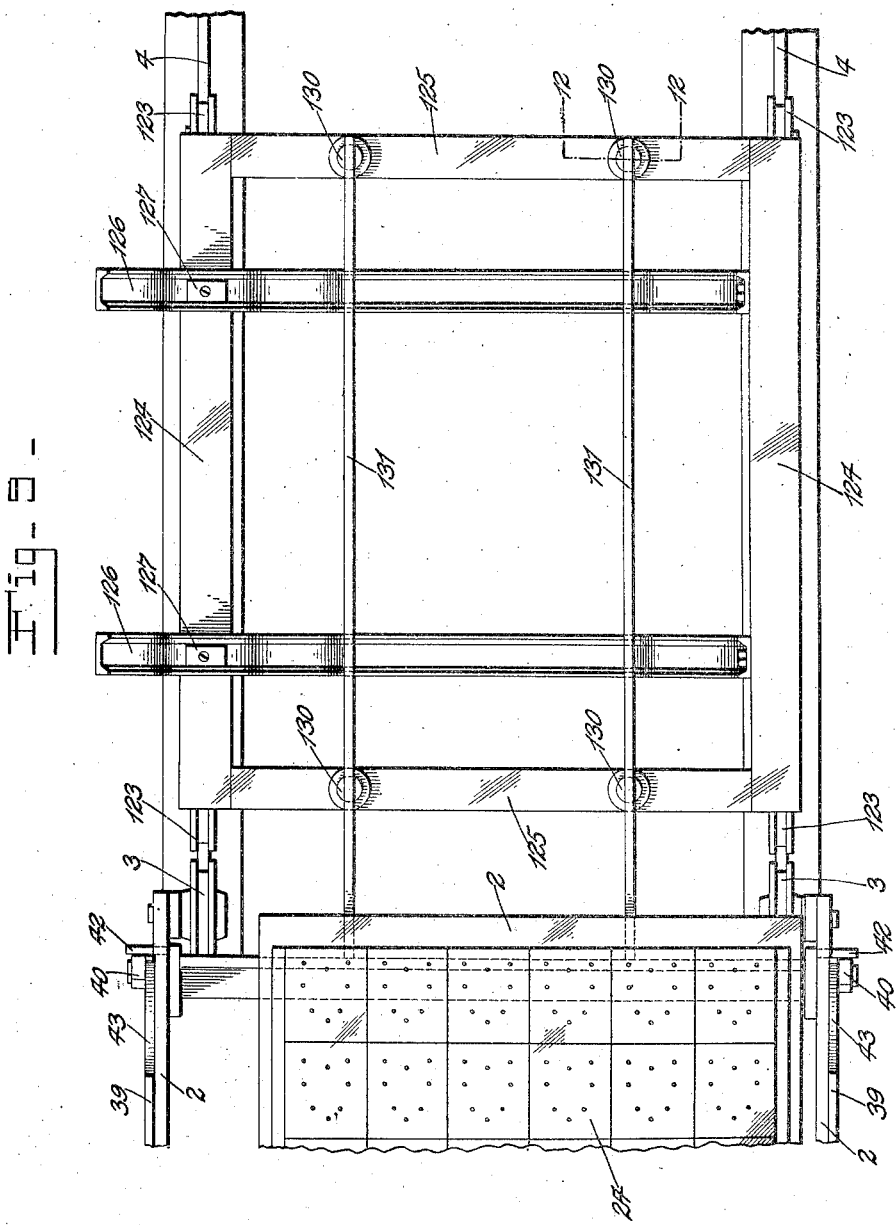

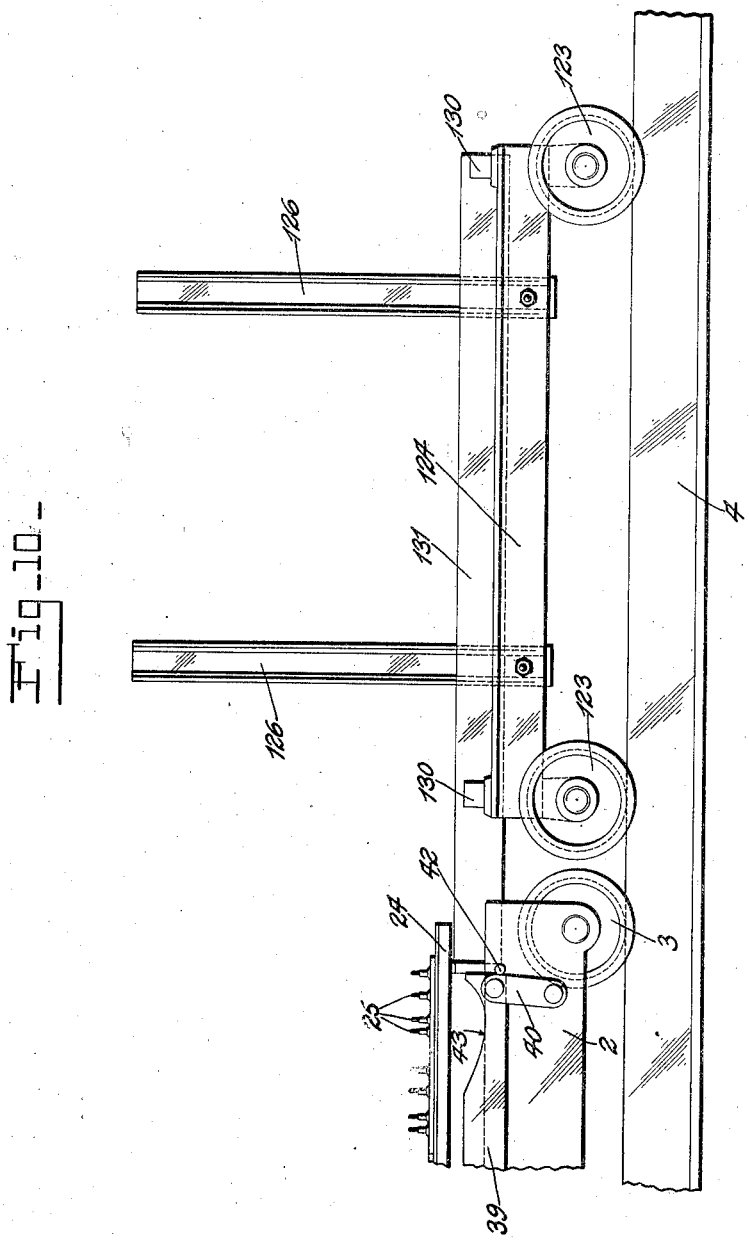

Feb. 17, 1925.  
J. H. KINTZELE  
1,526,345  
WASHER PLACING MACHINE FOR RUBBER HEEL MOLDS  
Filed Nov. 28, 1923    12 Sheets-Sheet 11
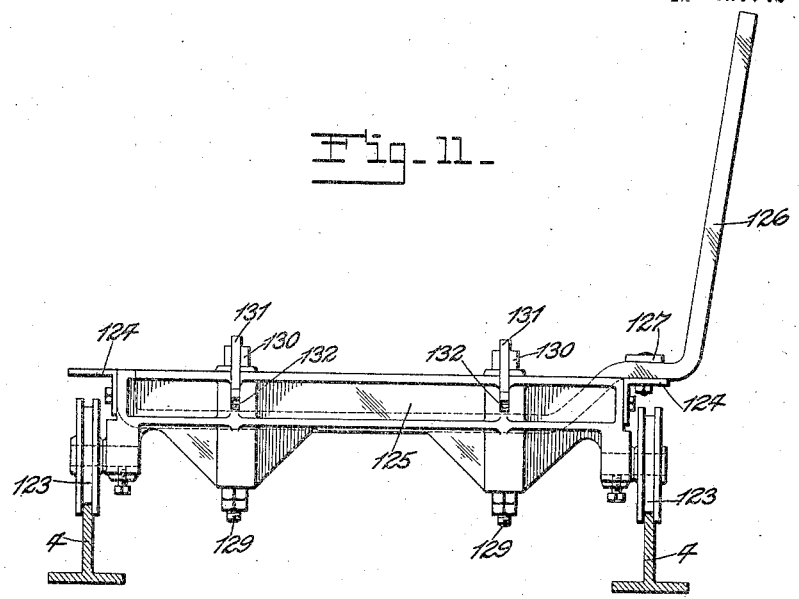
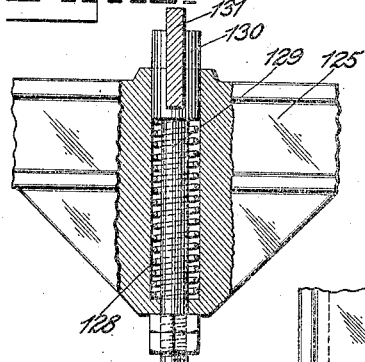
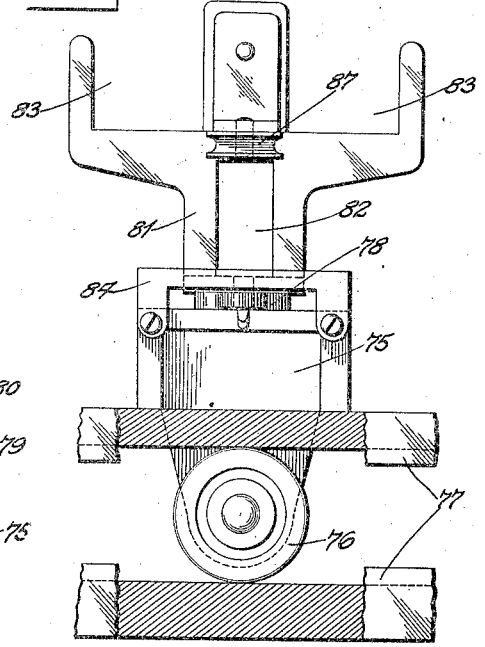
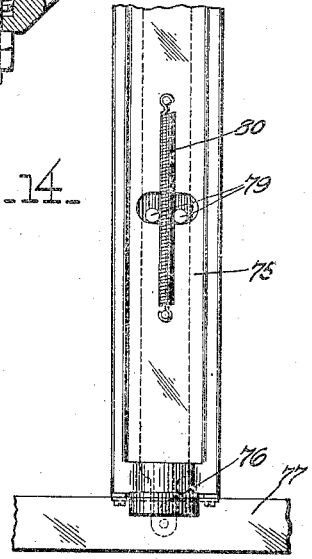
Inventor.
Julius H. Kintzele,
His Attorneys.

Feb. 17, 1925.
J. H. KINTZELE
1,526,345
WASHER PLACING MACHINE FOR RUBBER HEEL MOLDS
Filed Nov. 28, 1923   12 Sheets-Sheet 12
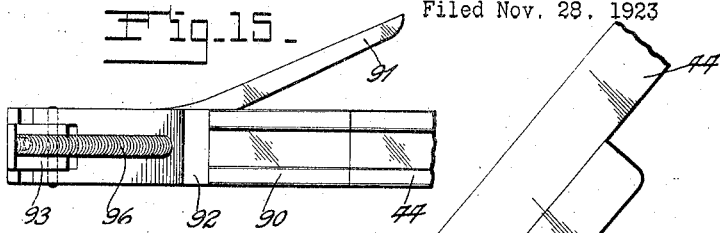
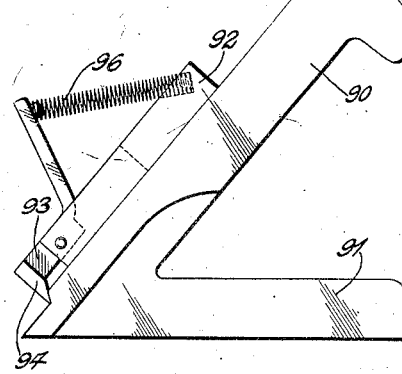
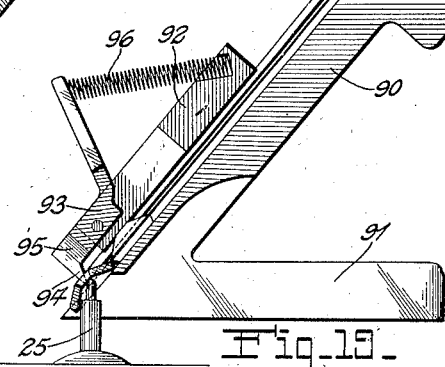
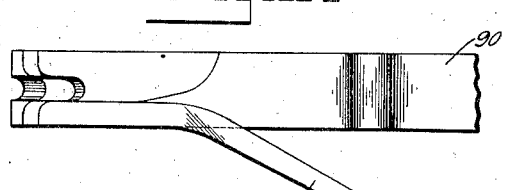
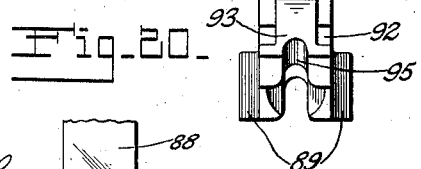
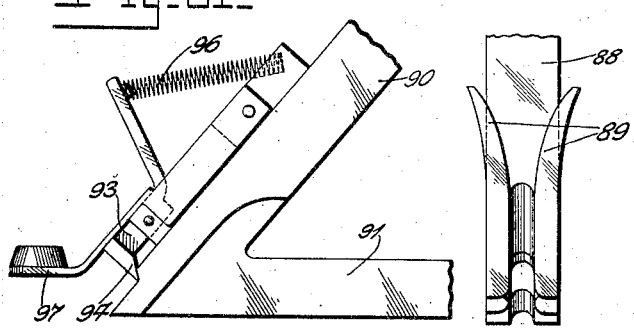
Inventor.
Julius H. Kintzele,
His Attorneys.

Patented Feb. 17, 1925.

1,526,345

UNITED STATES PATENT OFFICE.

JULIUS H. KINTZELE, OF ST. LOUIS, MISSOURI, ASSIGNOR OF ONE-HALF TO DRYDEN RUBBER COMPANY, OF CHICAGO, ILLINOIS, A CORPORATION OF ILLINOIS.

WASHER-PLACING MACHINE FOR RUBBER-HEEL MOLDS.

Application filed November 28, 1923. Serial No. 677,434.

*To all whom it may concern:*

Be it known that I, JULIUS H. KINTZELE, a citizen of the United States, residing at the city of St. Louis, State of Missouri, have invented a new and useful Washer-Placing Machine for Rubber-Heel Molds, of which the following is a specification.

This invention relates to machines for placing washers upon the pins of rubber heel molds.

An object of the invention is to provide a machine capable of adjustment and operation to obtain all the useful results that are obtained by the machine disclosed in my application Serial No. 578,482, and in addition to operate in such manner that it is better adapted for use in manufacturing establishments to place the washers upon the pins of the molds without requiring a reorganization of such arrangements.

Another object of the invention is to provide such a machine having controlling means whereby the machine may be moved in one direction over the mold containing the pins without interference thereby, and means for obtaining an adjustment so that when the machine is moved in the opposite direction the washers will be placed upon the pins automatically and as an incident to movement of the machine. In this connection it will be understood that I do not restrict myself to a construction in which the machine per se is moved, but I contemplate any arrangement in which a relative movement between the mold and the machine is obtained to effect the placing of the washers on the pins.

Another object of the invention is to provide a machine having numerous washer placing fingers capable of oscillation to place the washers upon zigzag rows of pins, and capable of adjustment to place washers upon pins in large or small molds, as desired.

Various other objects will appear from the following description, reference being made to the drawings in which—

Fig. 6 is an enlarged view with parts in section illustrating the hopper and feeding mechanism by which the washers are delivered to the fingers that guide the washers to the pins.

Fig. 7 is a plan view of the supporting frame of the machine which also supports the molds.

Fig. 8 is a plan view of the mechanism for operating the carriage of the machine in a direction to place the washers on the pins.

Fig. 9 is a plan view showing a part of the machine for placing the washers upon the pins of the molds and in addition showing a part of the machine for supporting the remaining parts of the molds.

Fig. 10 is a side elevation of the same mechanism.

Fig. 11 is an end elevation.

Fig. 12 is an enlarged sectional view on the line 12—12 of Fig. 9.

Fig. 13 is an enlarged front view with parts in section showing the device for controlling and supporting the washer placing fingers.

Fig. 14 is a view showing a device for centering and controlling the middle finger of each series of three fingers.

Fig. 15 is a top plan view of the discharge end of one of the side fingers of each series of three fingers.

Fig. 16 is a side elevation thereof.

Fig. 17 is a view showing one side of the discharge end of one of the side fingers of each series of three fingers.

Fig. 18 is a sectional view of one of such fingers.

Fig. 19 is a front end view of the middle finger of each series of three fingers.

Fig. 20 is a lower side view thereof.

Fig. 21 is a side elevation of a modified form of device for pressing the washer upon the pins after the washer has been discharged from the finger guiding it to the pin.

Figure 1:
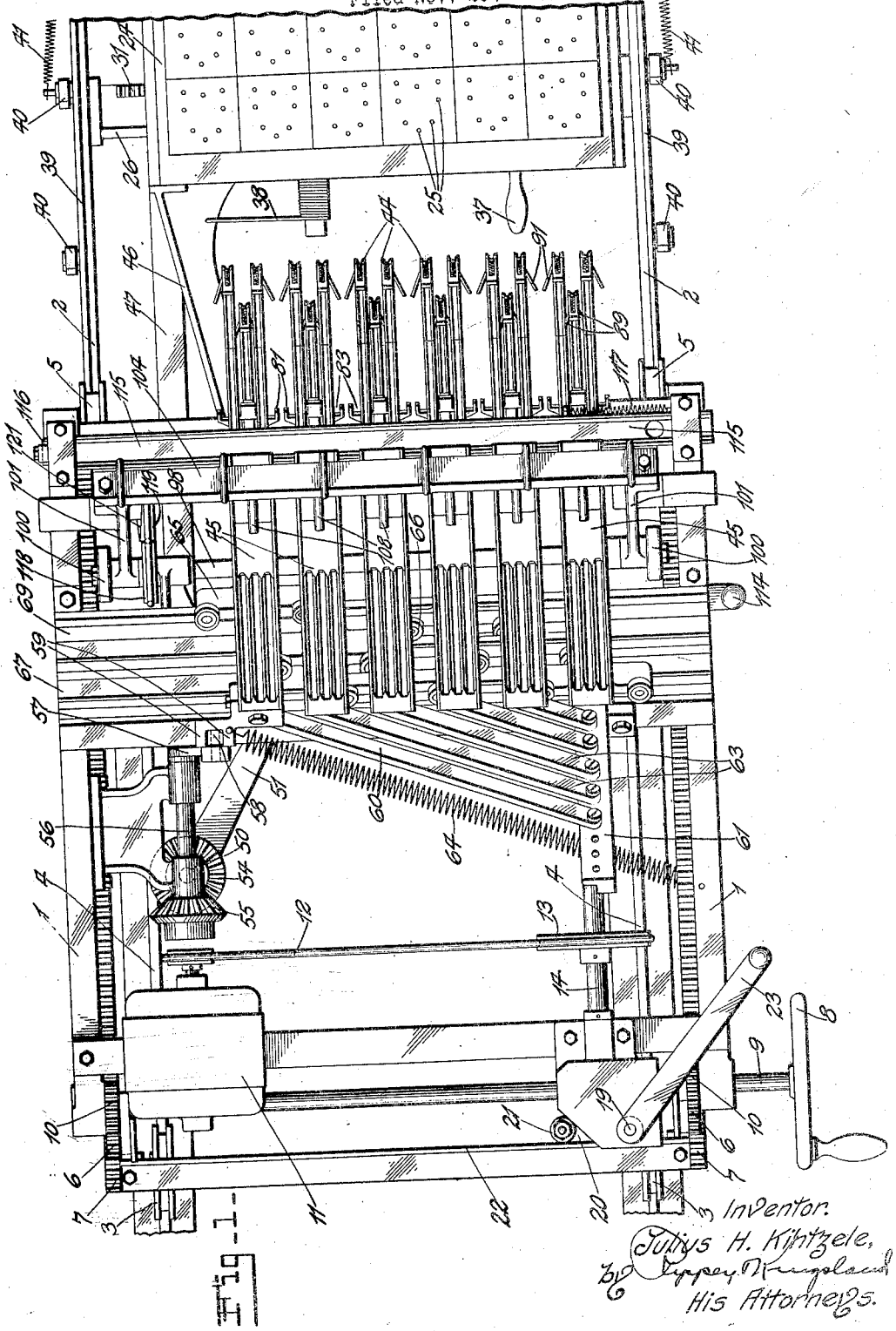
Fig. 1 is a plan view of my improved machine.

In the embodiment of the apparatus as shown the carriage 1, in which the washer placing fingers are mounted, is supported for reciprocating movements upon a carriage 2 having wheels 3 operative upon rails 4. One end of the carriage 1 is supported by wheels 5 operating upon the side members of the carriage 2 while the other end of the carriage 1 is supported by gear wheels 6 engaging and supported by racks 7 in connection with the side members of the carriage 2. The carriage 1 may be manually actuated in one direction by turning the hand wheel or crank 8 attached to a shaft 9 having rigid therewith pinions 10 which mesh with the gear wheels 6. Looking at Fig. 2 the carriage 1 will be manually operated toward the right and then operated by a power device to the position shown in said Fig. 2.

Figure 2:
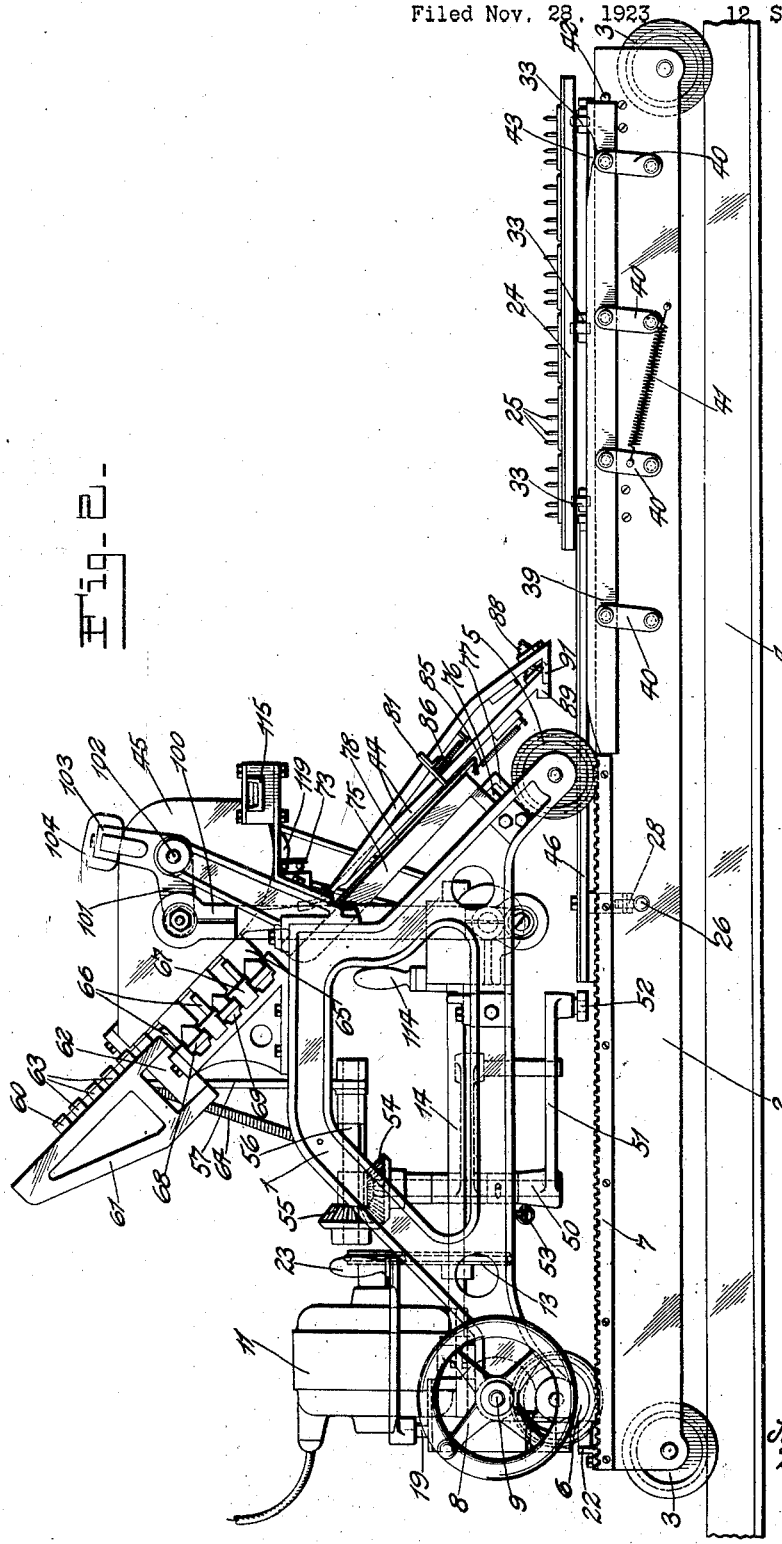
Fig. 2 is an elevation showing one side of the machine.
Figure 3:
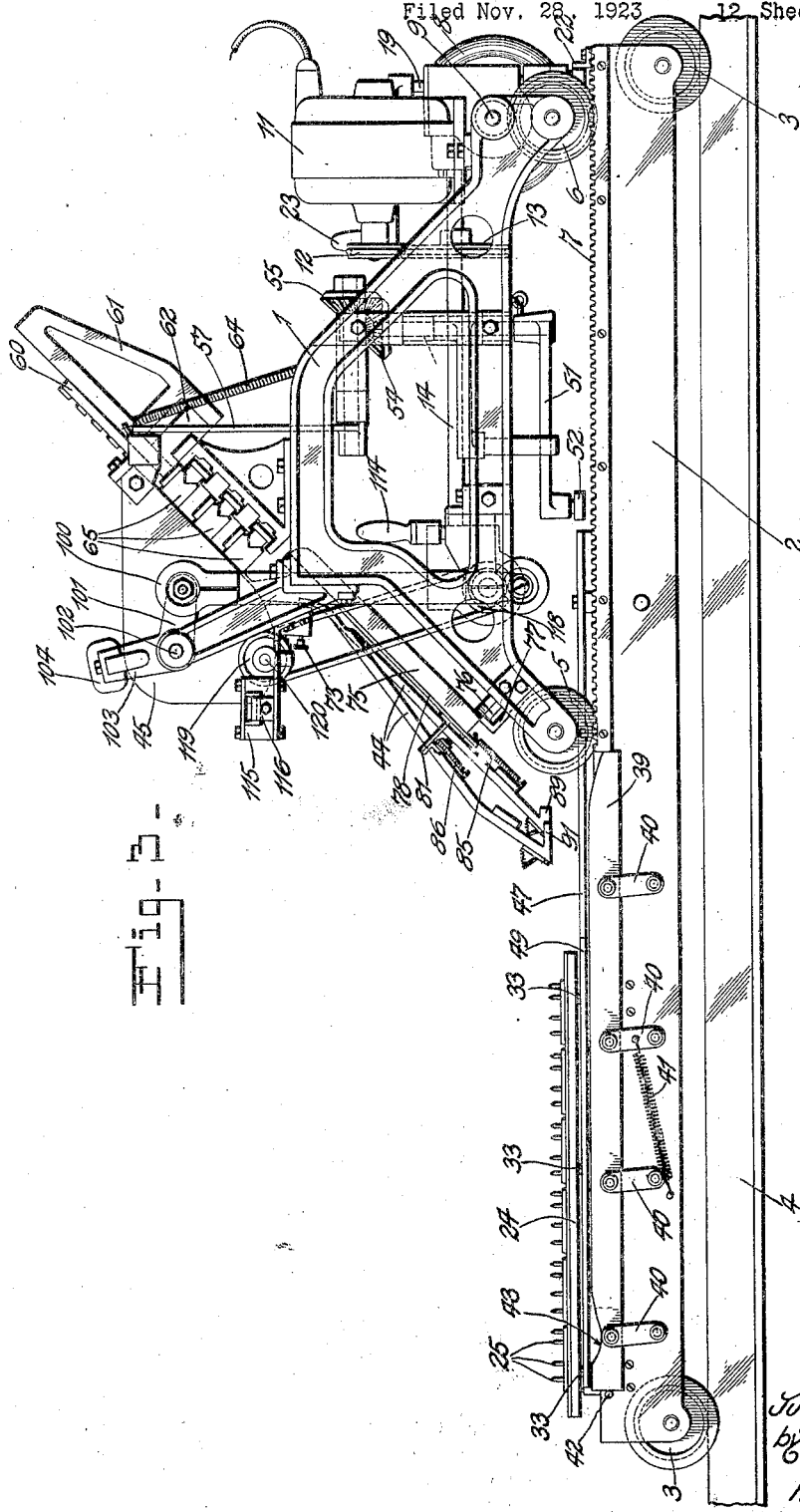
Fig. 3 is an elevation showing the opposite side of the machine.
Figure 4:
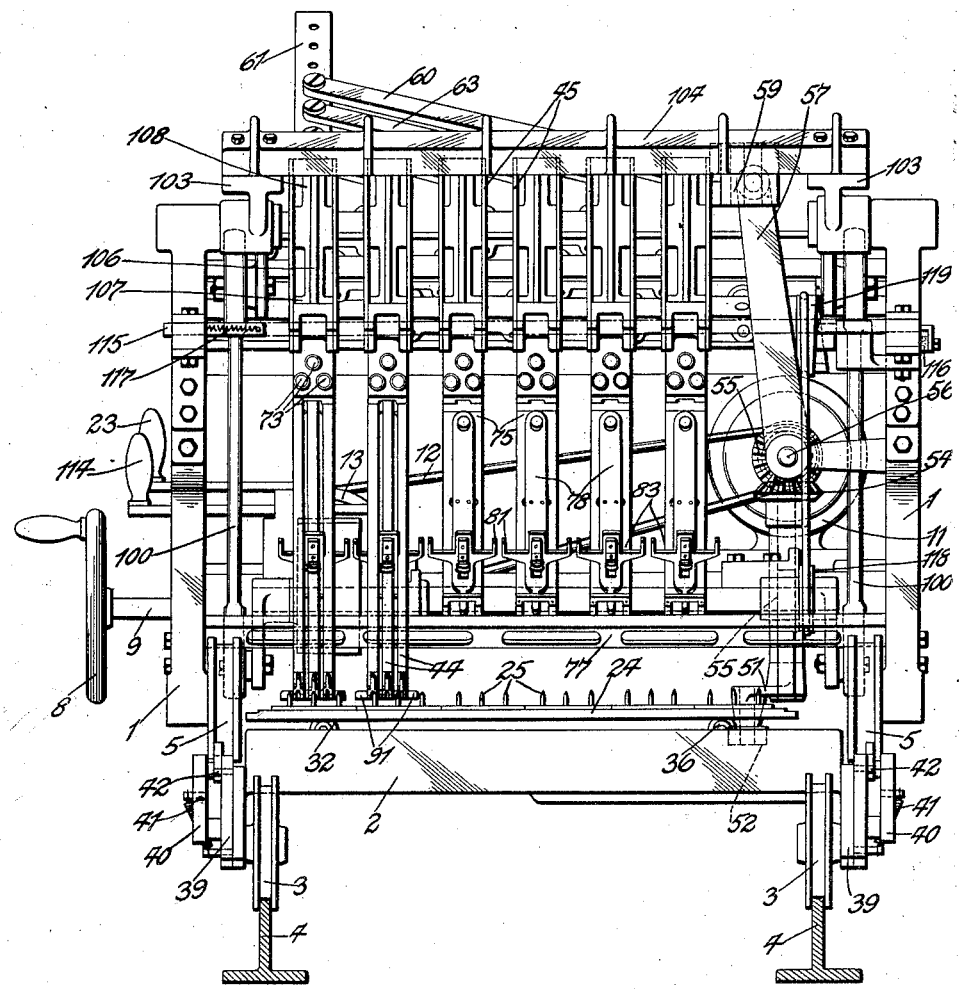
Fig. 4 is an elevation showing one end of the machine.
Figure 5:
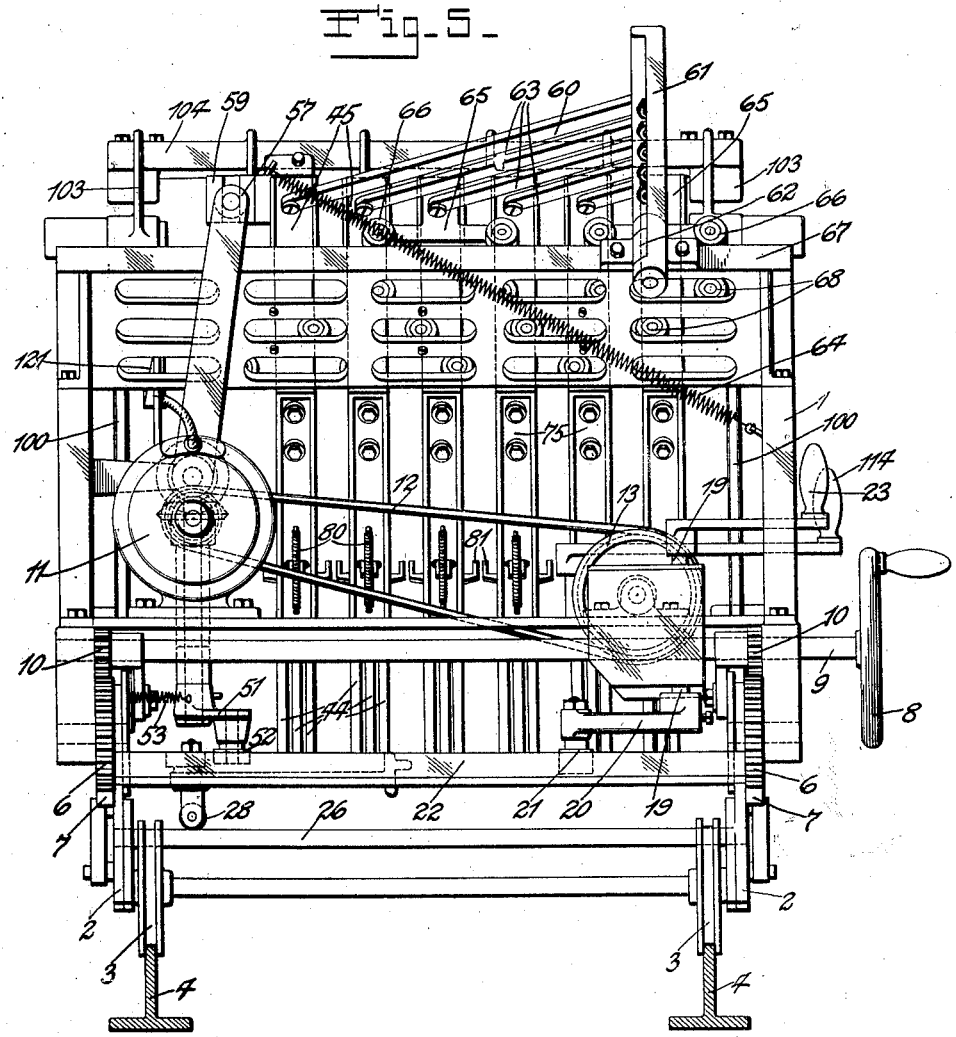
Fig. 5 is an elevation showing the opposite end of the machine.

A motor 11 on the carriage 1 (although it may be mounted elsewhere, if desired) operates a belt 12 engaging a pulley 13 on a shaft 14. The shaft 14 has a worm 15 meshing with a wheel 16 loosely supported upon the shaft 9. A clutch 17 on the shaft 9 is movable into and out of engagement with the corresponding clutch member on the wheel 16 by means of a lever 18 supported by a shaft 19 (Figs. 5 and 8). The lower end of the shaft 19 has a crank arm 20 equipped with a roller 21 which contacts with a part 22 on the carriage 2 when the carriage 1 moves to the position shown in Fig. 2, thereby releasing the clutch member 17 from the wheel 16 leaving the motor 11 in operation while the carriage 1 remains stationary. The motor continues to run while the carriage 1 is moved toward the right (as shown in Fig. 2). When the motor is moved to the proper position at the right a lever 23 is operated to engage the clutch member 17 with the wheel 16, with the result that the constantly running motor moves the carriage 1 in the opposite direction during which movement the washers are applied to the pins in the molds as hereinafter set forth.

The mold member 24 has series of pins 25 and the pins of the several series are in rows. Said mold member is supported by the carriage 2 which is constructed and equipped to receive mold members of different sizes. As shown (Fig. 7) the carriage 2 has cross pieces 26 supporting a part 27 which is transversely adjustable thereon.

The part 27 has rollers 28 operating on the parts 26 and supports a rotary shaft 29. Pinions 30 on the shaft 29 mesh with racks 31 and serve to hold the part 27, which is a carriage, in proper alinement upon the carriage 2. One of the side members of the carriage 2 supports a roller 32, and the carriage 27 supports a pair of rollers 33 upon which the mold part 24 is supported when in position to receive washers. In practice the under side of the mold part 24 may be provided with recesses to receive rollers 32 and 33 thus assuring accurate adjustment of the mold part. A shaft 34 in the carriage 27 has arms 35 carrying rollers 36 adapted to raise the end of the mold part 24 when it is desired to remove the mold part from the machine. A crank arm 37 in connection with the shaft 34 provides means for turning the shaft. Normally the shaft 34 is held by a spring 38 in position in which the rollers 36 do not support the mold part 24.

As the carriage 1 moves forwardly (to the right from the position shown in Fig. 2) the wheels 5 roll along pivotally supported track members 39 which are high enough above the side members of the carriage 2 to permit all parts supported by the carriage 1 to pass over the pins 25. The track members 39 are pivotally supported by links 40 held in upright position by springs 41. In their raised positions the forward ends of the track members 39 are against abutments 42. Near their forward ends the track members 39 have notches 43 which the wheels 5 enter to lower all parts supported by the carriage 1 and stop forward movement of the carriage 1 when the ends of the washer delivering fingers are beyond the mold 24. The lever 23 is then operated to engage the clutch 17, causing the motor to rotate the gear wheels 6 and thereby move the carriage 1 to its starting point, the wheels 5 depressing the track members 39 to permit said wheels to roll upon the upper edges of the side members of the carriage 2. When the wheels 5 pass from the track members 39 (Fig. 2) the springs 41 restore said track members to their raised positions.

The mechanism by which the washers are placed upon the pins 25 is supported by the carriage 1 and comprises series of fingers 44, each series in the present embodiment of the invention comprising three fingers. Each series of three fingers 44 is supported by a hopper 45 so that there is one of said hoppers 45 for each series of three fingers. The hoppers 45 are relatively adjustable in order to adjust the fingers 44 to proper positions to place washers upon rows of pins different distances apart since in molds for making small heels the rows of pins 25 are relatively close together, and in molds for making large heels the rows of pins are more widely spaced. Each series of fingers 44 delivers washers to all of the pins in a row of heel molds, so that each series of fingers serves a complete row of pins. This adjustment of the fingers 44 and their supporting hoppers 45 is effected automatically and as an incident to the operation of the machine by mechanism which I shall now describe.

As previously mentioned, the carriage 27 (Fig. 7) is adjustable in different positions to support molds of different sizes. The inner end of said carriage 27 has an up-standing flange 46 extending at an angle relative to the longitudinal axis of the carriage 2 as well as to the longitudinal axis of the carriage 27. A gate 47 is pivotally supported at one end and has its opposite end bearing against the flange 46 in which position it is yieldingly retained by a spring 48. The outer edge of the gate 47 is in alinement with a bar 49 on the carriage 27.

The carriage 1 supports a rock shaft 50 (Figs. 1, 2 and 7) having on its lower end a crank arm 51 equipped with a roller 52. The rock shaft 50 and the crank arm 51 are yieldingly held in the positions shown in Figs. 1 and 7 by a spring 53. As the carriage 1 moves forwardly from the position shown (Fig. 2) the roller 52 rolls along the flange 46, thereby turning the shaft 50 in one direction. The roller 52 opens the gate 47 and passes to the outer edge of the bar 49, the gate 47 then closing behind the roller 52. During backward movement of the carriage 1 the roller 52 rolls along the outer edge of the bar 49 and the gate 47, thereby holding the shaft 50 in the position to which it was turned, until the roller 52 passes beyond the inner end of the gate 47 (Fig. 7). The upper end of the shaft 50 has a beveled gear 54 meshing with a gear 55 on a shaft 56 to which the lower end of a lever 57 is attached. The upper end of the lever 57 has a roller 58 between a pair of flanges 59 (Fig. 1) in connection with one of the hoppers 45. The hopper 45 that is operated by the lever 57 is connected by a link 60 (Figs. 1 and 5) with an arm 61 pivoted to a stationary support 62, so that the arm 61 is oscillated thereby. Links 63 connect the arm 61 with the respective hoppers 45, so that said hoppers are differentially operated with the exception of the single hopper 45 at the opposite side of the carriage from the one to which the link 60 is connected. The excepted one of the hoppers 45 remains stationary and the remaining hoppers are adjusted relative to it and to each other. The links 63 are necessarily of progressively increasing length and are arranged in such relationship that the hoppers are properly spaced so that the fingers 44 will deliver washers to the pins 25 in any mold irrespective of the size of the mold within the limitations of the machine, and irrespective of the size of the heels for which the mold is designed. After the roller 52 leaves the inner end of the gate 47 (Fig. 7) the spring 53 is assisted by a spring 64 (Figs. 1 and 5) to restore the shaft 50 and the hoppers 45 to their initial positions for delivering washers to small molds. Each of the hoppers 45 is supported upon a corresponding carriage 65 having rollers 66 operating upon rails 67 and rollers 68 operating in channels 69.

The upper ends of the fingers 44 are supported by pivots 70 (Fig. 6) and are held in place by blocks 71 pressed by springs 72. A stem 73 in connection with each block 71 constitutes manual means for releasing the pressure of the blocks against the fingers to permit the fingers to be withdrawn. Each of the hoppers 45 has holes 74 opening into the upper ends of the respective hoppers to the fingers. The holes 74 and the passages through the fingers are shaped so that the washers cannot enter the holes or the fingers in improper positions, it being necessary that the washers enter the holes 74 and be placed upon the pins 25 with the convexed portion of the washers extending upwardly.

Each of the hoppers 45 supports a downwardly inclined arm 75, the lower end of which has a roller 76 operating within a groove in and between the side walls of a supporting rail 77. Plates 78 have their upper ends pivoted to the upper portions of the arms 75, respectively, each of said plates having a pair of pins 79 extending downwardly through a hole in the arm 75. A stretched coil spring 80, supported by the under side of each of the arms 75, extends between the pins 79 and yieldingly retains the plate 78 in proper position or permits oscillation thereof as may be required in the operation of the machine. Each of the plates 78 has an upwardly extended bracket 81 attached thereto provided with a hole 82 through which the middle finger 44 of the corresponding series of fingers extends, while the two side fingers of each series of fingers extend through notches 83 in the upper end of the corresponding bracket 81. When the machine is in idle position (Fig. 2) the two side fingers of each of the several series of fingers rest upon the bottom walls of the notches 83, while the middle fingers rest upon supports 84 (Figs. 6 and 13) in connection with the arms 75. Each middle finger is connected by a spring 85 with the lower end of the corresponding plate 78, the spring tending to hold the finger in one position but permitting oscillation of the finger as required to work properly. The two side fingers of each series of fingers are connected by a spring 86 stretched around a sheave 87 supported by the bracket 81, said spring tending to hold the side fingers in one position, but permitting oscillation thereof to operate upon zigzag rows of pins. The lower end of each middle finger 44 is provided with a washer delivering terminal comprising a part 88 (Figs. 19 and 20) forming a continuation of the finger and provided on its lower end with a pair of diverging fins 89 which contact with the sides of the pins 25, so that during movement of the carriage 1 the middle fingers are guided properly over the rows of pins to which they deliver washers. Each of the side fingers 44 is provided with a washer delivering terminal comprising a part 90 (Figs. 15, 16 and 17) forming a continuation of the finger and provided on its lower end with an outwardly curved fin 91 which contacts with the outer sides of the pins 25, so that during movement of the carriage 1 the side fingers are guided properly over the rows of pins to which they deliver washers.

A block 92 near the lower end of each of the parts 88 and 90 supports a pivoted element 93 having shoulders 94 at its lower end on opposite sides of a notch 95 which serve to retain the washers in the chutes until the washers are engaged by the pins 25 (Fig. 18). As the machine moves the pins 25 engage the washers and successively withdraw them from the fingers, the latch device 93—94 yielding against the pressure of their springs 96. During this operation the pins 25 extend through the holes in the washers and into the notches 95. When a washer is withdrawn the latch device 93—94 is actuated by its spring 96 to catch the next succeeding washer and retain it until it is removed in the same way.

In the finger terminal shown in Fig. 21 the pivoted element 93 is provided with a weighted extension 97 which presses upon the top of the washer that had just been placed upon a pin and stops vibration of and steadies the washer to prevent it from working off of the pins. This device 97 is useful where there is any considerable vibration of the parts that would be likely to displace the washers from the pins.

The carriage 1 supports a transverse shaft 98 (Figs. 6 and 8) having cranks 99 on its ends to which the lower ends of links 100 are connected. The upper ends of the links 100 are pivoted to arms 101 mounted on pivot supports 102, one at each side of the series of hoppers 45. Upwardly extended arms 103 are in connection with the arms 101 and support a bar 104 above and transversely of the series of hoppers 45. Each of the hoppers 45 supports a shaft 105 (Fig. 6) having depending arms 106 thereon which support stirrer blades 107 extending transversely and the full width of the respective hoppers in which they are located. Upwardly extended arms 108 have rollers 109 within a channel 110 in the under side of the bar 104, so that the hoppers are free to move laterally to their different adjusted positions and so that the stirrers 107 will be oscillated in the hoppers by the oscillation of the bar 104. This operation of the stirrers causes the washers to enter the holes 74 in proper adjustment, that is with their convex sides in position so that they will be up when placed upon the pins 25. The shaft 14 has a worm 111 thereon (Fig. 8) engaging a worm wheel 112 loose on the shaft 98 and provided with a clutch face on one side thereof. The clutch member 113 on the shaft 98 is movable into and out of engagement with the clutch device of the wheel 112 by means of a clutch operating lever 114. In this way washers are stirred and caused to enter the fingers as the machine operates.

Some of the washers pass over the stirrer blades 107 and are discharged into a trough 115 (Figs. 1 and 6) extending transversely in front of and below the open front ends of the hoppers 45. As the machine operates the trough 115 is vibrated or shaken endwise to cause the washers to move along within the trough and to be discharged at one end thereof. An elastic bumper 116 on one end of the trough stops movement of the trough in one direction and diminshes the noise that would result from the impact of metal against metal. A spring 117 actuates the trough 115 in one direction. A pulley 118 on the shaft 98 is belted to a pulley 119 on a support 120 having an abruptly shouldered cam 121 (Fig. 8) operating against a projection 122 on the trough 115. The cam 121 moves the trough in one direction while the spring 117 moves the trough in the opposite direction, thereby imparting lateral oscillating movements to the trough.

To the extent of placing the washers on the pin supporting member of the molds the invention as thus far described is complete. It may be desirable in some instances to have the other mold members close by so that the mold may be quickly assembled and used. To meet the conditions of this need, I have provided a carriage (shown in Figs. 9, 10 and 11) having wheels 123 operating upon the rails 4 for supporting the middle and top members of the mold close by the washer placing machine and the pin supporting member of the mold. The carriage comprises side frame members 124, end members 125, and upwardly and outwardly inclined standards 126 having blocks or shoulders 127 in connection with their lower portions adapted to hold a mold member placed between the blocks or shoulders and the standards 126, so that the mold members will remain inclined against the standards. Each of the end members 125 of the carriage has a pair of coiled springs 128 mounted in it and a pair of rods 129 extending through the springs. A head 130 on the upper end of each of the rods 129 bears upon the encircling spring 128 and yieldingly supports the rods. Bars 131 are supported by the rods 130 in notches 132 in the end members 125 of the carriage and are intended and adapted to support the third mold member. The shock of vibration is taken up by the springs 128.

As shown the carriage just described may be moved close to the carriage 2 and the mold may be conveniently assembled and completed and placed in use.

From the foregoing it will be seen that my invention is a practical one and obtains all of its intended objects and purposes conveniently and rapidly. Since the present practice includes the placing of the washers on the pins by hand, it will be seen that one of these machines will perform the work of many such manual operators and it is, therefore, a marked development and advance in the art. Obviously the construction and arrangement may be varied in numerous particulars without departure from the nature and principle of the invention, and I do not restrict myself to unessential limitations, but what I claim and desire to secure by Letters Patent is:—

1. A machine of the character described, comprising a carriage, a series of fingers having passages for conducting washers to positions for engagement by the pins to which the washers are to be applied, mechanism for adjusting the fingers to proper adjustments for placing the washers on the pins, and a device for operating said mechanism to adjust said fingers in proper spaced relationship as an incident to operation of the carriage.

2. A machine of the character described, comprising a carriage, hoppers in the carriage for containing washers, a series of fingers extending from each hopper for conducting the washers therefrom to position for engagement by pins in rows, mechanism for adjusting the hoppers and the fingers, and a device for operating said mechanism to move said fingers to proper adjustments for placing the washers on the pins as an incident to the operation of the carriage.

3. A machine of the character described, comprising a carriage, a series of fingers having passages for conducting washers to positions for engagement by the pins to which the washers are to be applied, automatic means for adjusting the fingers to proper adjustments for placing the washers on the pins as an incident to operation of the carriage, gearing for moving the carriage in both directions, manual means for operating said gearing to move the carriage in one direction, and a motor for operating said gearing to move the carriage in the opposite direction to its starting point.

4. A machine of the character described, comprising a carriage, mechanism in the carriage for placing washers upon pins in rows, manual means for moving the carriage from a starting point to a position for operation to place washers on the pins, a motor, and connections operated by the motor for operating a part of said manual means to move the carriage from said position to its starting point.

5. A machine of the character described, comprising a carriage, mechanism in the carriage for placing washers upon pins in rows, manual means for moving the carriage from a starting point to a position for operation to place washers on the pins, a motor, connections operated by the motor for propelling the carriage from said position to its starting point, and automatic means for releasing said connections during final movements of the carriage to its starting point.

6. A machine of the character described, comprising a series of passages for conducting washers to position for engagement by pins to which the washers are to be applied, pivoted elements preventing discharge of the washers from the passages until the washers are engaged by pins, and springs holding said pivoted elements in position to prevent movement of the washers from said passages.

7. A machine of the character described, comprising a series of passages for conducting washers to position for engagement by pins to which the washers are to be applied, pivoted elements preventing discharge of the washers from the passages until the washers are engaged by pins, springs holding said pivoted elements in position to prevent movement of the washers from said passages, and diverging pins on certain of said passages for engaging the sides of the pins.

8. A machine of the character described, comprising a carriage, a series of hoppers in the carriage having holes for the passage of washers therefrom, fingers having passages therethrough for receiving the washers from said holes, pivoted catches for holding the washers in the fingers, and springs controlling said catches.

9. A machine of the character described, comprising a carriage, a series of hoppers in the carriage having holes for the passage of washers therefrom, fingers having passages therethrough for receiving the washers from said holes, pivoted catches for holding the washers in the fingers, springs controlling said catches, wheels for supporting and moving said carriage, manual means for rotating said wheels to move the carriage in one direction, and a motor for rotating the wheels to move the carriage in the opposite direction.

10. A machine of the character described, comprising a carriage, mechanism in the carriage for delivering washers to pins to which the washers are to be applied, wheels for supporting and moving the carriage, manual means operable to rotate said wheels, and a power device operable to rotate said wheels independently of said manual means.

11. A machine of the character described, comprising a series of relatively adjustable hoppers, carriages supporting said hoppers respectively, fingers leading from said hoppers for delivering washers to pins to which the washers are to be applied, and automatic means for placing said hoppers and thereby the fingers properly to deliver washers to pins different distances apart.

12. A machine of the character described, comprising a series of relatively adjustable hoppers, carriages supporting said hoppers respectively, fingers leading from said hoppers for delivering washers to pins to which the washers are to be applied, automatic means for placing said hoppers and thereby the fingers properly to deliver washers to pins different distances apart, and a movable supporting carriage in which all of the parts aforesaid are mounted.

13. A machine of the character described, comprising a mold support, a carriage, mechanism for moving the carriage to position over a mold on the support, means for elevating the carriage during such movement, mechanism for moving the carriage in the opposite direction, means for permitting the carriage to assume a lower position during said last movement, and means supported by the carriage for placing washers upon the pins in the mold during said last movement.

14. A machine of the character described, comprising a reciprocating carriage, a series of laterally adjustable hoppers in the carriage, a series of washer delivering fingers leading from each of said hoppers, a spring for holding said hoppers relatively close together, and automatic means for moving the hoppers apart in opposition to said spring automatically and as an incident to movement of the carriage.

15. A machine of the character described, comprising a carriage, hoppers in the carriage for containing washers, a series of fingers extending from each hopper for conducting the washers therefrom to position for engagement by pins in rows, a stirrer in each hopper for causing the washers to enter the fingers, and mechanism for moving said carriage and operating said stirrers.

16. A machine of the character described, comprising a carriage, hoppers in the carriage for containing washers, a series of fingers extending from each hopper for conducting the washers therefrom to position for engagement by pins in rows, a stirrer in each hopper for causing the washers to enter the fingers, mechanism for moving said carriage and operating said stirrers, and automatic mechanism for adjusting the hoppers and the fingers in proper adjustments to place washers on pins in rows varying distances apart.

17. In a machine of the character described, a hopper, a finger for conducting washers from the hopper to positions for engagement by pins to which the washers are to be applied, a stirrer in the hopper, means for operating the stirrer to cause the washers to enter the fingers, a trough in position to receive washers falling from the hopper, and a cam for moving the trough in one direction and a spring for moving the trough in the other direction, to cause the washers to discharge from the trough.

18. A machine of the character described, comprising a number of laterally adjustable hoppers, fingers for conducting washers from the hoppers to positions for engagement by pins to which the washers are to be applied, a stirrer in each of said hoppers, means for operating said stirrers to cause the washers to enter the fingers, a trough in position to catch washers falling from said hoppers, and a cam for moving the trough in one direction and a spring for moving the trough in the other direction, to cause the washers to be discharged from the trough.

19. A machine of the character described, comprising a support, a rack in connection with said support, a carriage, a gear wheel in the carriage engaging said rack, mechanism for rotating said gear wheel to propel the carriage in opposite directions, a series of fingers in said carriage for conducting washers to positions for engagement by pins to which the washers are to be applied, and mechanism for causing the washers to enter said fingers.

20. A machine of the character described, comprising a support, a rack in connection with said support, a carriage, a gear wheel in the carriage engaging said rack, mechanism for rotating said gear wheel to propel the carriage in opposite directions, a series of fingers in said carriage for conducting washers to positions for engagement by pins to which the washers are to be applied, mechanism for causing the washers to enter the fingers, and means for operating said last-named mechanism as an incident to movement of the carriage.

21. A machine of the character described, comprising a support, a rack in connection with said support, a carriage, a gear wheel in the carriage engaging said rack, mechanism for rotating said gear wheel to propel the carriage in opposite directions, a series of fingers in said carriage for conducting washers to positions for engagement by pins to which the washers are to be applied, mechanism for causing the washers to enter the fingers, means for operating said last-named mechanism as an incident to movement of the carriage, and means for raising the carriage when the carriage is moved in one direction and lowering the carriage when it is moved in the opposite direction.

22. A machine of the character described, comprising a support, a carriage mounted on the support, mechanism for moving the carriage back and forth on the support, fingers mounted in the carriage for conducting washers to positions for engagement by pins in rows, and means for raising the carriage when the carriage is moved in one direction and lowering the carriage when it is moved in the opposite direction.

23. In a machine of the character described, a carriage, a series of hoppers in the carriage, fingers in connection with said hoppers for conducting washers therefrom to positions for engagement by pins in rows, and mechanism for proportionally adjusting the hoppers and the fingers to positions corresponding to the spaces between the rows of pins automatically and as an incident to the operation of the carriage.

24. In a machine of the character described, a carriage, a series of hoppers in the carriage, fingers in connection with said hoppers for conducting washers therefrom to positions for engagement by pins in rows, mechanism for proportionally adjusting the hoppers and the fingers to positions corresponding to the spaces between the rows of pins automatically and as an incident to the operation of the carriage, and means for restoring the hoppers and the fingers to their initial positions after completion of an operation of the carriage.

25. In a machine of the character described, a carriage, a series of hoppers mounted in the carriage, a series of fingers for conducting washers from each hopper to positions for engagement by pins in rows, a pivoted arm, links connecting said arm with said hoppers respectively, and mechanism for operating said arm to place the hoppers and the fingers in accordance with the rows of pins automatically and as an incident to the operation of the carriage.

26. In a machine of the character described, a support, a carriage adjustable to different lateral positions in the support for supporting molds of different sizes, means for retaining the molds in position upon said supports and said carriage, mechanism for placing washers upon pins in the molds, and a device for raising the molds after the washers have been placed on the pins.

27. In a machine of the character described, a device adjustable in different positions to support molds of different sizes, a carriage movable back and forth above said device and the molds thereon, a series of fingers supported by said carriage for conducting washers to position for engagement by pins in rows in the molds, mechanism in the carriage for moving said fingers to different spaced positions, and means in connection with said device for operating said mechanism to space the fingers in conformity with the distances between the rows of pins in the molds on said device.

28. A machine of the character described, comprising a support, gear racks in connection with the support, a carriage, gear wheels in the carriage meshing with said racks, manual means for rotating said gear wheels to move the carriage, and a series of fingers in said carriage for conducting washers to positions for engagement by pins when the carriage is moved.

29. A machine of the character described, comprising a support, racks in connection with the support, a carriage, gear wheels in the carriage engaging said racks, manual mechanism for rotating said gear wheels to move the carriage in one direction, power mechanism for rotating said gear wheels to move the carriage in the opposite direction, and a series of fingers in the carriage for conducting washers to positions for engagement by pins when the carriage is moved.

30. A machine of the character described, comprising a support, racks in connection with the support, a carriage, gear wheels in the carriage engaging said racks, manual mechanism for rotating said gear wheels to move the carriage in one direction, power mechanism for rotating said gear wheels to move the carriage in the opposite direction, a series of fingers in the carriage for conducting washers to positions for engagement by pins when the carriage is moved, and means for raising and lowering the carriage when it is operated.

31. A machine of the character described comprising a carriage, mechanism for moving the carriage back and forth, a series of hoppers in the carriage, fingers for conducting washers from the hoppers to positions for engagement by pins in rows, a pivoted arm, links connecting said arm with said hoppers respectively, a rock shaft, means for turning said rock shaft a distance having a corresponding ratio to the distances between the rows of pins, and connections operated by said rock shaft for operating said pivoted arm to move said hoppers and said fingers correspondingly.

32. A machine of the character described, comprising a carriage, mechanism for moving the carriage back and forth, a series of hoppers in the carriage, fingers for conducting washers from the hoppers to positions for engagement by pins in rows, a pivoted arm, links connecting said arm with said hoppers respectively, a rock shaft, means for turning said rock shaft a distance having a corresponding ratio to the distances between the rows of pins, connections operated by said rock shaft for operating said pivoted arm to move said hoppers and said fingers correspondingly, and means for restoring the hoppers and fingers to their initial positions after each operation.

33. A machine of the character described, comprising a carriage, mechanism for moving the carriage back and forth, a series of hoppers in the carriage, fingers for conducting washers from the hoppers to positions for engagement by pins in rows, a pivoted arm, links connecting said arm with said hoppers respectively, a rock shaft, means for turning said rock shaft a distance having a corresponding ratio to the distances between the rows of pins, connections operated by said rock shaft for operating said pivoted arm to move said hoppers and said fingers correspondingly, a stirrer device for causing the washers to pass from the hoppers into the fingers, and means for operating said stirrer device or not as desired when the carriage is operated.

34. A machine of the character described, comprising a carriage, fingers in the carriage for conducting washers to positions for engagement by pins in rows, a stationary rack, a gear wheel in connection with the carriage engaging said rack, a motor mounted on the carriage, driving connections from said motor to said gear wheel for rotating said gear wheel and thereby moving the carriage, and means for releasing said connections to permit the motor to run while the carriage remains stationary.

35. A machine of the character described, comprising a carriage, fingers in the carriage for conducting washers to positions for engagement by pins in rows, a stationary rack, a gear wheel in connection with the carriage engaging said rack, a motor mounted on the carriage, driving connections from said motor to said gear wheel for rotating said gear wheel and thereby moving the carriage, means for releasing said connections to permit the motor to run while the carriage remains stationary, and means for rotating said gear wheel to move the carriage independently of the motor whether the motor be running or not.

36. A machine of the character described, comprising a hopper, fingers for conducting washers from the hopper to positions for engagement by pins, a stirrer in the hopper for causing the washers to enter the fingers, a rotary shaft, connections from said shaft for operating said stirrer, a motor, connections operated by the motor for rotating said shaft, and means for releasing said last-named connections to permit the motor to run while said shaft remains stationary.

37. A machine of the character described, comprising a hopper, fingers for conducting washers from the hopper to positions for engagement by pins, a stirrer in the hopper for causing the washers to enter the fingers, a rotary shaft, connections from said shaft for operating said stirrer, a motor, connections operated by the motor for rotating said shaft, means for releasing said last-named connections to permit the motor to run while said shaft remains stationary, and mechanism operated by said motor for moving the carriage.

38. A machine of the character described, comprising a movable supporting carriage, an additional carriage supported for movement upon the supporting carriage, means for supporting molds upon the supporting carriage, fingers in the additional carriage for conducting washers to positions for engagement by pins in the molds when the additional carriage is moved over the supporting carriage, and mechanism for operating said additional carriage.

39. A machine of the character described, comprising a movable supporting carriage, an additional carriage supported for movement upon the supporting carriage, means for supporting molds upon the supporting carriage, fingers in the additional carriage for conducting washers to positions for engagement by pins in the molds when the additional carriage is moved over the supporting carriage, mechanism for operating said additional carriage, and mechanism for causing the washers to enter said fingers when the additional carriage is moved.

40. A machine of the character described, comprising a movable supporting carriage, an additional carriage supported for movement upon the supporting carriage, means for supporting molds upon the supporting carriage, fingers in the additional carriage for conducting washers to positions for engagement by pins in the molds when the additional carriage is moved over the supporting carriage, mechanism for operating said additional carriage, and mechanism for spacing said fingers corresponding to the rows of pins automatically and as an incident to the operation of the additional carriage.

41. A machine of the character described, comprising a movable supporting carriage, an additional carriage supported for movement upon the supporting carriage, means for supporting molds upon the supporting carriage, fingers in the additional carriage for conducting washers to positions for engagement by pins in the molds when the additional carriage is moved over the supporting carriage, mechanism for operating said additional carriage, mechanism for causing the washers to enter said fingers when the additional carriage is moved, and mechanism for spacing said fingers corresponding to the rows of pins automatically and as an incident to the operation of the additional carriage.

42. A machine of the character described, comprising a movable carriage, mechanism for moving said carriage back and forth, a series of hoppers in said carriage, a series of fingers for conducting washers from each of said hoppers to positions for engagement by pins, a pivoted arm, links connecting said arm with said hoppers respectively, a rock shaft, connections from said rock shaft for moving one of said hoppers and thereby causing said arm and said links to move the remaining hoppers differentially, and devices for operating said rock shaft in conformity with the distances between the rows of pins to which the washers are to be applied.

JULIUS H. KINTZELE.